No. 671,695. Patented Apr. 9, 1901.
W. H. HAMMON.
PIPE COUPLING.
(Application filed June 13, 1899. Renewed Dec. 28, 1900.)
(No Model.) 2 Sheets—Sheet 1.

FIG.I.

WITNESSES: INVENTOR,
William H. Hammon
by Dannis & Wolcott
Att'y.

No. 671,695. Patented Apr. 9, 1901.
W. H. HAMMON.
PIPE COUPLING.
(Application filed June 13, 1899. Renewed Dec. 28, 1900.)

(No Model.) 2 Sheets—Sheet 2.

WITNESSES:
Herbert Bradley
A. E. Gaither

INVENTOR,
William H. Hammon
by Dennis S. Wolcott
Att'y.

UNITED STATES PATENT OFFICE.

WILLIAM H. HAMMON, OF PITTSBURG, PENNSYLVANIA.

PIPE-COUPLING.

SPECIFICATION forming part of Letters Patent No. 671,695, dated April 9, 1901.

Application filed June 13, 1899. Renewed December 28, 1900. Serial No. 41,399. (No model.)

*To all whom it may concern:*

Be it known that I, WILLIAM H. HAMMON, a citizen of the United States, residing at Pittsburg, in the county of Allegheny and State of Pennsylvania, have invented or discovered certain new and useful Improvements in Pipe-Couplings, of which improvements the following is a specification.

The invention described herein relates to improvements in pipe-couplings having for their object a construction of coupling whereby two adjacent pipe-sections may be laid and united either in line with or at an angle to each other, thereby permitting of the laying of a pipe-line over irregular surfaces or the horizontal curvature of the line to avoid obstructions.

The invention is hereinafter more fully described and claimed.

Figure 1:
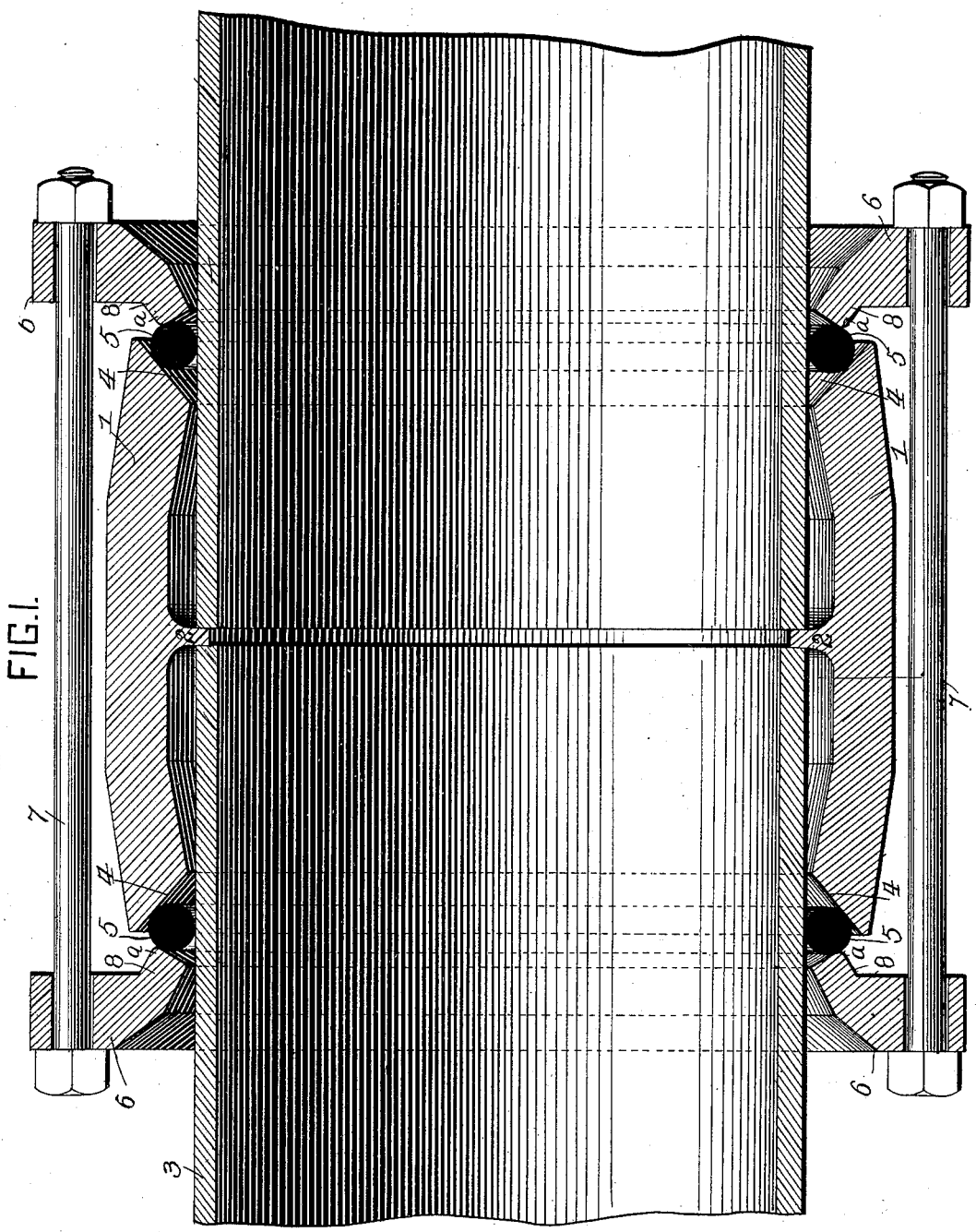
Figure 2:
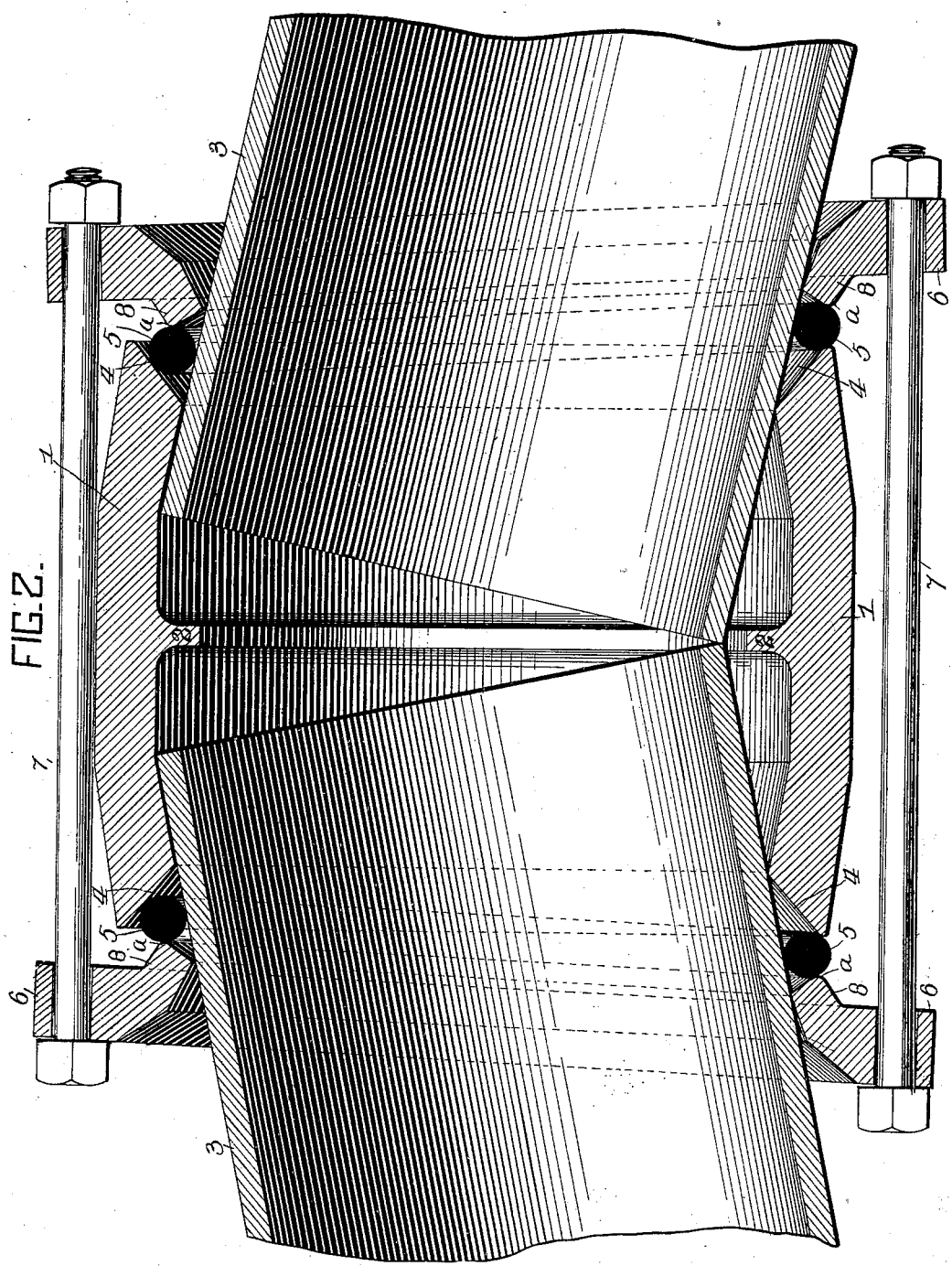

In the accompanying drawings, forming a part of this specification, Figure 1 is a sectional elevation of two adjacent pipe-sections arranged in line with each other and connected by my improved coupling, and Fig. 2 is a similar view showing the application of the coupling to two angularly-arranged sections.

In the practice of my invention the connecting-sleeve 1 is formed with an annular abutment 2, against which the ends of the pipe-sections 3 bear. The sleeve is constructed at points adjacent to its ends a little larger than the external diameters of the pipe-sections to be connected, so that the latter will slip easily into the sleeve. From these points of least diameter the inner walls of the sleeve are enlarged or outwardly inclined, so that the portions of the pipe-sections within the sleeve can have considerable play or lateral movement. As will be seen by a comparison of Figs. 1 and 2, the centers of the relative movements correspond approximately to the planes of smallest diameter of the sleeve. The ends of the sleeve are inwardly beveled or inclined, as at 4, said inclined or beveled faces forming, with the walls of the pipe-section, V-shaped pockets or recesses for the reception of a suitable packing. This packing is preferably made in the form of an annular gasket 5, circular in cross-section and of a yielding resilient material, as rubber, so that it may be compressed and forced into the shaped pockets or recesses.

The packing-rings 5 are forced into the V-shaped pockets or recesses by means of follower-rings 6, which are drawn toward each other and the ends of the sleeve by bolts 7, passing through the follower-rings and having one or both ends threaded for the reception of nuts. On the sides adjacent to the sleeves the rings are formed with laterally-projecting ribs or toes 8, which will bear against the packing-rings. The smallest diameters of these rings are a little greater than the external diameters of the pipe-sections, so that the rings will slide freely along the latter. In order that the rings may take positions at an angle to the axes of the pipe-sections, their inner portions on each side of planes passing through the smallest diameters or points of bearing on the pipe-sections are outwardly inclined or beveled, as shown.

The forwardly-projecting toes or ribs 8 are so constructed and proportioned relative to the pockets or recesses at the ends of the sleeve that the bearing edges *a* of the toes or ribs would in all positions of the sleeve and pipe-sections enter the pockets or recesses of the sleeve. In other words, the direction of pressure of the bearing edges of the toes will be at all times inside the pockets or recesses, thereby insuring the entrance of the packing into said pockets. On the other hand, the diameters of the bearing edges *a* should be such relative to the mean diameters of the packing-rings that said edges will bear on the rings outside the mean diameters of the packing-ring. In other words, the diameter of the bearing edges should be greater than the mean diameter of the packing-ring, but less than the greatest diameter of the pockets or recesses in the ends of the sleeve. Such location of the bearing edges *a* and the inclined outer faces of the pockets or recesses of the sleeve will cause a good pressure of the packing-rings on the pipe-sections, as well as on the inclined faces 4.

It is characteristic of my improved coupling that by beveling the walls at the ends of the sleeve the packing-rings are forced down against the pipe-sections and caused to grip the same tightly, thereby forming tight joints and also holding the pipe-sections as against longitudinal movement out of the sleeve.

I claim herein as my invention—

1. A pipe-coupling having in combination a sleeve internally enlarged from points adjacent to its ends, and having its end walls beveled or outwardly inclined, packing-rings, follower-rings, and means for moving the follower-rings toward the sleeve to compress the packing-rings in the recess at the ends of the sleeve, substantially as set forth.

2. A pipe-coupling having in combination a sleeve having its end walls beveled or outwardly inclined, packing-rings, follower-rings provided with forwardly-projecting toes or ribs having bearing edges of a diameter less than the greatest diameter of the inclined or beveled end walls of the sleeve and greater than the mean internal diameter of the packing-rings, and means for moving the follower-rings toward the sleeve, substantially as set forth.

3. A pipe-coupling having in combination a sleeve internally enlarged from points adjacent to its ends and having its end walls beveled or outwardly-inclined, packing-rings, follower-rings provided with forwardly-projecting toes or ribs having bearing edges of a diameter less than the greatest diameter of the inclined or beveled end walls of the sleeve and greater than the mean diameter of the packing-rings, substantially as set forth.

In testimony whereof I have hereunto set my hand.

WILLIAM H. HAMMON.

Witnesses:
  F. E. GAITHER,
  DARWIN S. WOLCOTT.